United States Patent
Eriksson

(10) Patent No.: US 8,634,719 B2
(45) Date of Patent: Jan. 21, 2014

(54) SYSTEMS AND METHODS FOR ENABLING DIFFERENT NETWORK NODES OF A NETWORK ACCESS SYSTEM TO SHARE A BACKHAUL COMMUNICATIONS LINK

(75) Inventor: Per-Erik Eriksson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 207 days.

(21) Appl. No.: 13/145,623

(22) PCT Filed: Jan. 21, 2009

(86) PCT No.: PCT/IB2009/000098
§ 371 (c)(1),
(2), (4) Date: Aug. 19, 2011

(87) PCT Pub. No.: WO2010/084365
PCT Pub. Date: Jul. 29, 2010

(65) Prior Publication Data
US 2011/0293271 A1    Dec. 1, 2011

(51) Int. Cl.
*H04B 10/00* (2013.01)
(52) U.S. Cl.
USPC ........... 398/115; 398/72; 398/71; 398/68; 398/66; 398/67; 398/76; 398/69; 398/100; 370/338; 370/401; 370/328; 370/352; 455/422; 455/561; 455/562; 455/524; 725/105; 725/106; 725/125; 725/127; 725/129

(58) Field of Classification Search
USPC ......... 398/115, 66, 67, 68, 70, 71, 72, 98, 99, 398/100, 79, 74, 75, 76, 77, 78; 370/352, 370/401, 328, 338, 252, 254, 465, 389, 370/468; 455/422, 524, 562, 561; 725/105, 725/106, 125, 127, 129
See application file for complete search history.

(56) References Cited

U.S. PATENT DOCUMENTS 7,130,335 B1 * 10/2006 Cheng et al. ............... 375/222
2010/0098433 A1 * 4/2010 Boyd et al. ............... 398/155

FOREIGN PATENT DOCUMENTS

EP    1619827 A1    1/2006

OTHER PUBLICATIONS

R Mestric, J Brouet, F Duthilleul, F Gavioli: "Transforming Mobile Backhauling into a Packet-based Network" Alcatel Telecommunications Review, Feb. 2007.*
Ericsson, "High-speed technologies for mobile backhaul", White paper, Uen Rev D, vol. 284 23-3119, Oct. 2008, pp. 1-19; XP-002550458.
Mestric, et al., "Transforming mobile backhauling into a packet-based network", Technology White Paper, Alcatel-Lucent Telecommunications Review; Feb. 2007; pp. 28-33; XP002550457.

* cited by examiner

*Primary Examiner* — Hanh Phan
(74) *Attorney, Agent, or Firm* — Rothwell, Figg, Ernst & Manbeck, P.C.

(57) ABSTRACT

Systems and methods for enabling different network nodes of a network access system to share a backhaul communication link are disclosed. In one embodiment, the method includes: connecting a first modem to a first node of the network access system; connecting a second modem to a second node of the network access system; connecting the first modem to a first port of a splitter filter; connecting the second modem to a second port of the splitter filter; and connecting a backhaul communication link to a third port of the splitter filter, which is configured to multiplex signals transmitted by the modems onto the backhaul communication link, wherein the frequency spectrum of the signal transmitted by the first modem does not overlap substantially with the frequency spectrum of the signal transmitted by the second modem.

16 Claims, 3 Drawing Sheets

SYSTEMS AND METHODS FOR ENABLING DIFFERENT NETWORK NODES OF A NETWORK ACCESS SYSTEM TO SHARE A BACKHAUL COMMUNICATIONS LINK

CROSS REFERENCE TO RELATED APPLICATION(S)

This application is a 35 U.S.C. §371 National Phase Entry Application from PCT/IB2009/000098, filed Jan. 21, 2009, designating the United States, the disclosure of which is incorporated herein in its entirety by reference.

TECHNICAL FIELD

The present invention relates to the field of mobile communication systems. More specifically, aspects of the present invention relate to systems and methods for enabling different network nodes of a network access system to share a backhaul communication link.

BACKGROUND

Several digital subscriber line (DSL) technologies exist that are capable of providing broadband access over copper wires. These DSL technologies include: High Bit Rate Digital Subscriber Line (HDSL), Symmetric HDSL, Asymmetric Digital Subscriber Line (ADSL/ADSL2/ADSL2plus), and Very High Speed Digital Subscriber Line 2 (VDSL2).

SHDSL and other HDSL systems are generally central-office (CO) based systems due to their symmetrical properties and long reach capability, and are typically used to transport E1 (2048 kbit/s) or T1(1544 kbit/s) traffic. SHDSL/HDSL technologies are frequently used in leased line applications for mobile backhauling of GSM and/or WCDMA traffic. In these applications, the dominant layer 2 protocol is Asynchronous Transfer Mode (ATM) or Time Division Multiplexed (TDM).

On short loops, VDSL2 systems provide much higher data rates than other DSL technologies. A typical deployment scenario for VDSL2 is to install fiber to some network access point close to the end user (e.g., a cabinet or in the end user's basement) and in this network access point place the VDSL2 modem. A name for this kind of scenario is "Fiber to the Node (FTTN)" (other names for this scenario include: "Fiber to the cabinet/curb (FTTC)" and "Fiber to the building/basement (FTTB)").

Because of its high speed capability (e.g., 100 Mbit/s), VDSL2 is an attractive technology for mobile backhauling of High Speed Packet Access (HSPA) and Long term Evolution (LTE) radio access traffic. However, it is anticipated that any new backhauling technology (e.g., VDSL2) should be backwards compatible when it comes to transport of legacy mobile access like GSM and WCDMA. Furthermore it is assumed that the layer 2 protocol for HSPA or LTE backhauling will be Ethernet.

The introduction of high speed data in the mobile network will require high speed backhauling. When copper is used for this transport, VDSL2 will be a suitable choice. It is also anticipated that when new technologies like HSPA or LTE are installed in an existing network access system, the service provider will keep its GSM or WCDMA for some amount of time until all traffic running on these legacy mobile systems have been smoothly migrated over to HSPA or LTE.

In the scenario where a network access system will include high speed technologies (e.g., HSPA/LTE) and legacy technologies (e.g., GSM/WCDMA), an approach to providing the mobile backhauling of the traffic is to install an additional communication link (e.g., twisted-pair copper cable) to handle the HSPA/LTE traffic and to use VDSL2 over this communication link. However, this solution may be problematic because such an additional communication link may not be available or may be available only at great expense.

What is desired are systems and methods for overcoming the above described problem.

SUMMARY

It is the object of the present invention to overcome at least some of the above identified disadvantages.

In one aspect, the invention provides an improved network access system that overcomes the problem of having to use an additional communication link in the scenario where the network access system will include high speed technologies and legacy technologies. In some embodiments, the improved network access system includes the following: (1) a first network node (e.g., an LTE/HSPA base station), (2) a first modem (e.g., a VDSL2 modem) connected to a port of the first network node, (3) a second network node (e.g., a GSM/WCDMA base station) co-located with the first network node, (4) a second modem (e.g., an SHDSL/HDSL modem) connected to a port of the second network node, (5) a splitter filter having, and (6) a backhaul communication link (e.g., a twisted-pair cable) connected to a first port of the splitter filter. The backhaul communication link extends from the splitter filter to a network access point located remotely from the splitter filter. A port of the first modem is connected to a second port of the splitter filter and a port of the second modem is connected to a third port of the splitter filter. Advantageously, the splitter filter is configured to multiplex onto the backhaul communication link a signal output by the first modem and a signal output by the second modem. An advantage of the improved network access system is that an additional communication link is obviated.

In some embodiments, the first modem is configured such that the signal output by the first modem substantially occupies only a first frequency spectrum and the second modem is configured such that the signal output by the second modem substantially occupies only a second frequency spectrum. The first frequency spectrum does not overlap substantially with the second frequency spectrum. The first frequency spectrum may start at a higher frequency than the frequency at which the second frequency spectrum ends.

In some embodiments, the first network node is configured to transmit Ethernet packets and the first modem is configured to receive and transmit the Ethernet packets, and the second network node is configured to transmit asynchronous transfer mode (ATM) packets and the second modem is configured to receive and transmit the ATM packets.

In another aspect, the invention provides an improved network access point that obviates the problem of having to use an additional communication link in the scenario where a network access system will include high speed technologies and legacy technologies. In some embodiments, the improved network access point includes: (1) a first splitter filter, (2) a backhaul communication link (e.g., a twisted-pair cable) connected to a first port of the first splitter filter and connecting the first splitter filter with a second splitter filter located remotely from the first splitter filter, (3) a first modem (e.g., a VDSL2 modem), co-located with the first splitter filter and having a port that is connected to a second port of the first splitter filter; and (4) a second communication link connected to a third port of the first splitter filter. The second communication link terminates at a second modem (e.g., an SHDSL/

HDSL modem) located remotely from the first splitter filter. An advantage of the improved network access point is that an additional communication link is obviated.

In some embodiments, the network access point further includes an Optical Network Unit connected to the first modem and co-located with the first modem. The network access point may also include an optical fiber connecting the Optical Network Unit 136 with an Optical Line Terminal located in a central office.

In some embodiments, the first modem is configured such that a signal output by the first modem via the port connected to the second port of the first splitter filter substantially occupies only a first frequency spectrum. In some embodiments, the second modem is configured such that a signal transmitted onto the second communication link by the second modem substantially occupies only a second frequency spectrum. Preferably, the first frequency spectrum does not overlap substantially with the second frequency spectrum. The first frequency spectrum may start at a higher frequency than the frequency at which the second frequency spectrum ends.

In another aspect, the present invention provides a method for enabling a first network node (e.g., an LTE/HPSA base station) and a second network node (e.g., a GSM/WCDMA base station) of a network access system to share a backhaul communication link (e.g. a twisted-pair cable), thereby obviating an additional communication link. In some embodiments, the method includes the following steps: (1) connecting a first modem (e.g., a VDSL2 modem) to a port of the first network node, (2) connecting a second modem (e.g., an SHDSL/HDSL modem) to a port of the second network node, (3) connecting a port of the first modem to a first port of a splitter filter so that a first signal transmitted by the first modem is received at the first port of the splitter filter, (4) connecting a port of the second modem to a second port of the splitter filter so that a second signal transmitted by the second modem is received at the second port of the splitter filter, and (5) connecting the backhaul communication link to a third port of the splitter filter. Advantageously, the splitter filter is configured to multiplex the first and second signals onto the backhaul communication link, thereby obviating the need for an additional communication link. Preferably, the second modem is configured to implement a protocol different than the protocol the first modem is configured to implement. Also, it is preferred that the first signal substantially occupies only a first frequency spectrum, and the second signal substantially occupies only a second frequency spectrum that does not overlap substantially with the first frequency spectrum The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
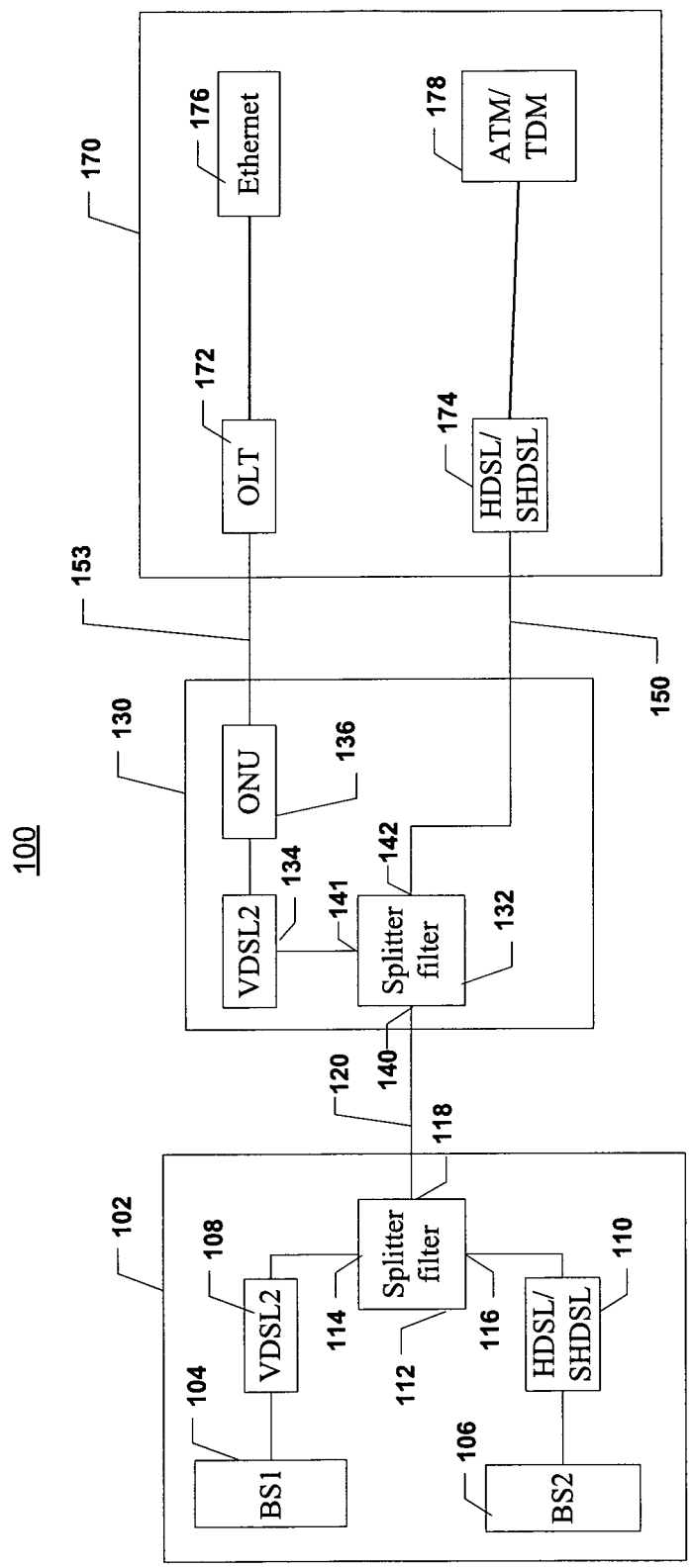
FIG. 1 illustrates a mobile communication system according to an embodiment of the invention.

Referring now to FIG. 1, FIG. 1 illustrates a mobile communication system 100 according to an embodiment of the invention. As illustrated in FIG. 1, mobile communication system 100 includes a network access system 102, a network access point 130, and a central office 170.

Network access system 102, as shown in FIG. 1, may include a number of network nodes (e.g., base stations). For simplicity, two base stations 104, 106 are shown. Base station 104 may be an HSPA/LTE base station, and base station 106 may be a legacy base station (e.g., a GSM/WCDMA base station). Base station 104 may be configured to transmit data traffic to a node (e.g., a gateway or other node) within a remote Ethernet network 176, and base station 106 may be configured to transmit data traffic to a node within a remote ATM/TDM network 178. In order to enable base stations 104, 106 to transmit traffic to networks 176, 178, respectively, a backhaul communication link 120 (e.g., a twisted-pair cable) is provided for connecting network access system 102 with network access point 130, a communication link 153 is provided for connecting network access point 130 with central office 170, and a communication link 150 is provided for connecting network access point 130 with central office 170.

Because of the scarcity and/or expense of communications links, in a preferred embodiment, base stations 104, 106 share backhaul communication link 120. Accordingly, in some embodiments, as shown in FIG. 1, a splitter filter 112 (e.g., a diplexer or other splitter filter) is used to connect base stations 104, 106 to backhaul communication link 120. More specifically, in the embodiment shown, splitter filter 112 has three ports: a first port 114 (e.g., a high frequency port), a second port 116 (e.g., a low frequency port), and a third port 118, where first port 114 is connected to base station 104 via modem 108, second port 116 is connected to base station 106 via modem 110, and third port 118 is connected to backhaul communication link 120. Because base station 104 may require higher speed backhauling than base station 106, modem 108 is preferably a higher speed modem than modem 110. For example, in the embodiment shown, modem 108 is a VDSL2 modem and modem 110 is an SHDSL or HDSL modem.

As shown in FIG. 1, backhaul communication link 120 terminates at network access point 130. More specifically, in the embodiment shown, backhaul communication link 120 terminates at a splitter filter 132 of network access point 130. Like splitter filter 112, splitter filter 132 includes three ports: a first port 140, a second port 141, and a third port 142, where first port 140 is connected to backhaul communication link 120, second port 141 is connected to a modem 134 co-located with splitter-filter 132, and third port 142 is connected to modem 174 located at a central office 170 via communication link 150. In the embodiment shown, modem 134 is connected to an Optical Network Unit (ONU) 136 that is co-located with modem 134 and modem 174 is connected to network 178. ONU 136 connects, via a fiber optic cable 153, to an Optical Line Terminal (OLT) 172, which is connected to network 176.

As illustrated in FIG. 1, a single backhaul communication link 120 can be used to connect the network nodes 104, 106 of network access system 102 to network access point 130 even though network nodes 104, 106 utilize different network protocols (e.g., network node 104 uses Ethernet while network node 106 uses ATM/TDM). For example, an aspect of the present invention provides a solution for transporting ATM/

TDM traffic over a communication link (e.g., a copper pair) using SHDSL/HDSL while simultaneously transporting Ethernet traffic over the same communication link using VDSL2.

As shown in FIG. 1, a solution, according to one embodiment, is to transmit both the SHDSL and VDSL2 traffic over the same backhaul communication link 120 by utilizing splitter filters 112 and 132 at the ends of backhaul communication link 120. In such an embodiment, a suitable VDSL2 profile and power spectrum density (PSD) are chosen such that the VDSL2 and SHDSL/HDSL frequencies are separated. This will result in a "VDSL2 over SHDSL/HDSL" solution that is somewhat similar to how plain old telephone service (POTS) or integrated services digital network (ISDN) traffic is transported below ADSL or VDSL2 frequencies.

Figure 2:
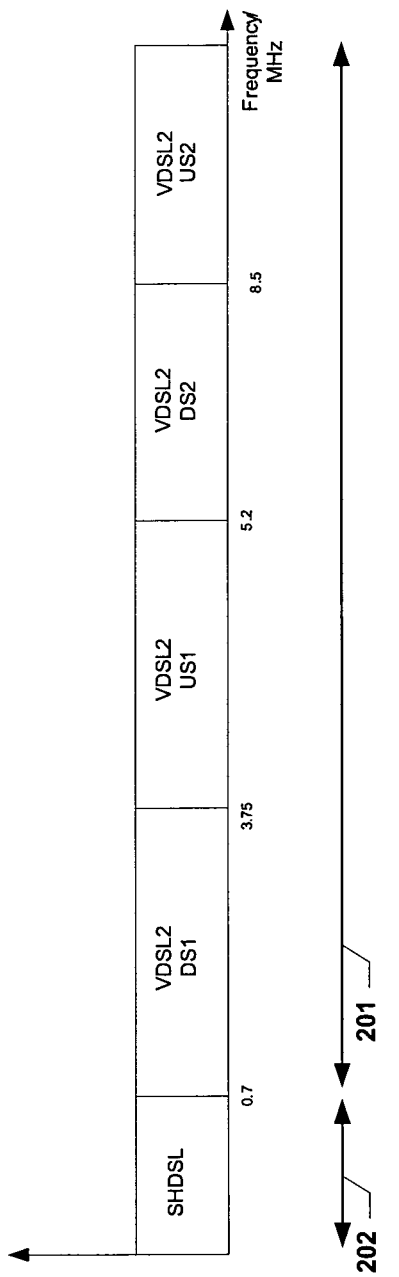
FIG. 2 is a diagram illustrating an exemplary bandplan.

That is, the frequency spectra can be managed in such a way that the frequency spectrum used by modems 108 and 134 will be placed above the frequency spectrum used by modems 110 and 174. This feature is illustrated in FIG. 2. FIG. 2 shows one possible VDSL2 bandplan for an 8 MHz bandwidth profile. However, as one of ordinary skill in the art will appreciate, in VDSL2 there are several possible profiles and PSDs. For example, there are profiles for not only 8 MHz bandwidth but also 12 MHz, 17 MHz and 30 MHz. A bandplan describes how the bandwidth is divided between frequencies used for downstream transmission and frequencies used for upstream transmission. The invention is not limited to any specific VDSL2 profile, PSD or bandplan.

Figure 3:
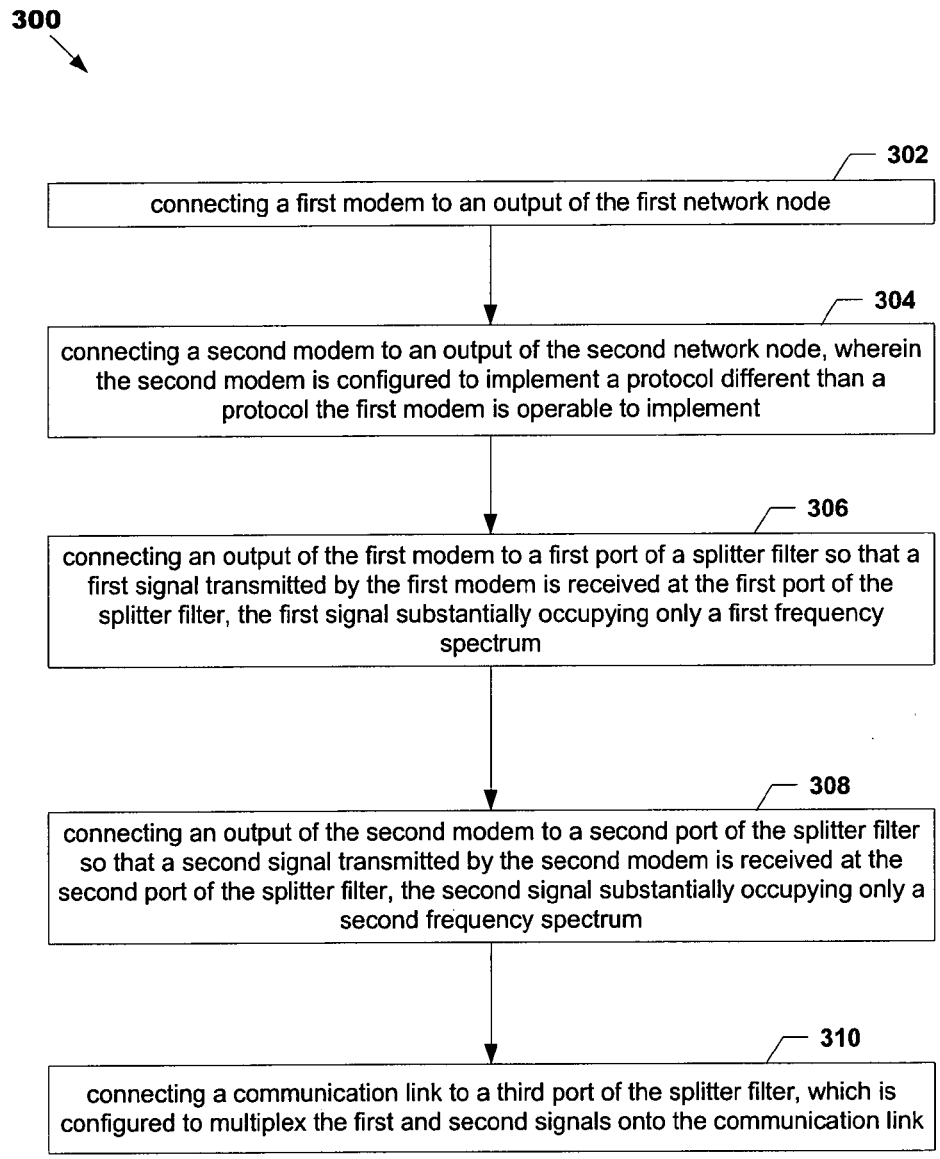
FIG. 3 is a flow chart illustrating a process according to some embodiments of the invention.

Referring now to FIG. 3, FIG. 3 is a flow chart illustrating a process 300 for connecting network node 104 to network 176 and network node 106 to network 178. Process 300 may begin in step 302, where an operator connects modem 108 to an output of network node 104. In step 304, the operator connects modem 110 to an output of network node 106. In some embodiments, modem 110 is configured to implement a protocol different than a protocol modem 108 is operable to implement. For example, as described above, modem 110 may be configured to implement the SHDSL/HDSL protocol, while modem 108 may be configured to implement the VDSL2 protocol. In step 306, the operator connects an output of modem 108 to port 114 of splitter filter 112 so that a signal transmitted by modem 108 is received at port 114 of splitter filter 112, which signal substantially occupies only a first frequency spectrum. In step 308, the operator connects an output of modem 110 to port 116 of splitter filter 112 so that a signal transmitted by modem 110 is received at port 116 of splitter filter 112, which signal substantially occupies only a second frequency spectrum that does not overlap with the first frequency spectrum. In step 310, the operator connects backhaul communication link 120 to port 118 of splitter filter 112, which is configured to multiplex the first and second signals onto backhaul communication link 120. In this manner, network nodes 104 and 106 can share backhaul communication link 120 without significant interference.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A network access system, comprising:
   a first network node;
   a first modem connected to a port of the first network node;
   a second network node co-located with the first network node;
   a second modem connected to a port of the second network node;
   a splitter filter having a first port, a second port, and a third port; and
   a backhaul communication link connected to the first port of the splitter filter, said backhaul communication link extending from the splitter filter to a network access point located remotely from the splitter filter, wherein
   a port of the first modem is connected to the second port of the splitter filter,
   a port of the second modem is connected to the third port of the splitter filter,
   the splitter filter is configured to multiplex onto the backhaul communication link a signal output by the first modem and a signal output by the second modem,
   the first modem is a Very High Speed Digital Subscriber Line 2 (VDSL2) modem, and
   the second modem is a High Bit Rate Digital Subscriber Line (HDSL) modem or a Symmetric HDSL (SHDSL) modem.

2. The network access system of claim 1, wherein
   the first modem is configured such that the signal output by the first modem substantially occupies only a first frequency spectrum,
   the second modem is configured such that the signal output by the second modem substantially occupies only a second frequency spectrum, and
   the first frequency spectrum does not overlap substantially with the second frequency spectrum.

3. The network access system of claim 2, wherein the first frequency spectrum starts at a higher frequency than the frequency at which the second frequency spectrum ends.

4. The network access system of claim 1, wherein the backhaul communication link is a twisted-pair cable.

5. The network access system of claim 1, wherein
   the first network node is configured to transmit Ethernet packets and the first modem is configured to receive and transmit the Ethernet packets, and
   the second network node is configured to transmit asynchronous transfer mode (ATM) cells or time division multiplexing (TDM) data and the second modem is configured to receive and transmit the ATM cells or TDM data.

6. The network access system of claim 1, wherein the network access point comprises:
   a second splitter filter having a first port, a second port, and a third port, the first port being connected to the backhaul communication link;
   a third modem, co-located with the second splitter filter, having a port that is connected to the second port of the second splitter filter; and
   a second communication link connected to the third port of the splitter filter, the second communication link terminating at a fourth modem located remotely from the second splitter filter.

7. The network access system of claim 6, wherein the third modem is a Very High Speed Digital Subscriber Line 2 (VDSL2) modem and the fourth modem is a High Bit Rate Digital Subscriber Line (HDSL) modem or a Symmetric HDSL (SHDSL) modem.

8. The network access system of claim 1, wherein the first network node is base station that implements a high speed packet access (HSPA) or a Long Term Evolution (LTE) protocol and the second network node is base station that implements a Global System for Mobile communications (GSM) or code division multiple access (WCDMA/CDMA) protocol.

9. A network access point, comprising:
- a first splitter filter having a first port, a second port, and a third port, the first port being connected to a first communication link connecting the first splitter filter with a second splitter filter located remotely from the first splitter filter;
- a first modem, co-located with the first splitter filter, having a port that is connected to the second port of the first splitter filter;
- a second communication link connected to the third port of the first splitter filter, the second communication link terminating at a second modem located remotely from the first splitter filter;
- an Optical Network Unit connected to the first modem and co-located with the first modem, wherein the first modem is connected to the first splitter filter; and
- an optical fiber connecting the Optical Network Unit with an Optical Line Terminal located in a central office.

10. The network access point of claim 9, wherein the first modem is a Very High Speed Digital Subscriber Line 2 (VDSL2) modem.

11. The network access point of claim 9, wherein
the first modem is configured such that a signal output by the first modem via the port connected to the second port of the first splitter filter substantially occupies only a first frequency spectrum,
the second modem is configured such that a signal transmitted onto the second communication link by the second modem substantially occupies only a second frequency spectrum, and
the first frequency spectrum does not overlap substantially with the second frequency spectrum.

12. The network access point of claim 11, wherein the first frequency spectrum starts at a higher frequency than the frequency at which the second frequency spectrum ends.

13. The network access point of claim 9, wherein the backhaul communication link is a twisted-pair cable.

14. A method for enabling a first network node and a second network node of a network access system to share a backhaul communication link, comprising:
- connecting a first modem to a port of the first network node;
- connecting a second modem to a port of the second network node, wherein the second modem is configured to implement a protocol different than a protocol the first modem is operable to implement;
- connecting a port of the first modem to a first port of a splitter filter so that a first signal transmitted by the first modem is received at the first port of the splitter filter, the first signal substantially occupying only a first frequency spectrum;
- connecting a port of the second modem to a second port of the splitter filter so that a second signal transmitted by the second modem is received at the second port of the splitter filter, the second signal substantially occupying only a second frequency spectrum; and
- connecting a backhaul communication link to a third port of the splitter filter, which is configured to multiplex the first and second signals onto the backhaul communication link, wherein
the first frequency spectrum does not overlap substantially with the second frequency spectrum,
the first modem is a Very High Speed Digital Subscriber Line 2 (VDSL2) modem, and
the second modem is a High Bit Rate Digital Subscribe Line (HDSL) modem or a Symmetric HDSL (SHDSL) modem.

15. The method of claim 14, wherein the first frequency spectrum starts at a higher frequency than the frequency at which the second frequency spectrum ends.

16. The method of claim 14, wherein the backhaul communication link is a twisted-pair cable.

* * * * *

UNITED STATES PATENT AND TRADEMARK OFFICE
CERTIFICATE OF CORRECTION

PATENT NO.        : 8,634,719 B2                                    Page 1 of 1
APPLICATION NO.   : 13/145623
DATED             : January 21, 2014
INVENTOR(S)       : Eriksson It is certified that error appears in the above-identified patent and that said Letters Patent is hereby corrected as shown below:

In the Claims

In Column 8, Line 31, in Claim 14, delete "Subscribe" and insert -- Subscriber --, therefor.

Signed and Sealed this
Eighth Day of July, 2014

Michelle K. Lee
*Deputy Director of the United States Patent and Trademark Office*